United States Patent [19]

Fodera

[11] 4,403,646

[45] Sep. 13, 1983

[54] ENERGY SAVING THERMOSTAT

[76] Inventor: Anthony W. Fodera, 55-28 138th St., Flushing, N.Y. 11355

[21] Appl. No.: 415,588

[22] Filed: Sep. 7, 1982

[51] Int. Cl.[3] ...................... H01H 37/04; G05D 23/00

[52] U.S. Cl. .................................... 165/11 R; 236/47; 337/360; 337/380

[58] Field of Search ........................... 236/1 R, 47, 94; 165/11 R; 337/325, 327, 360, 380

[56] References Cited

U.S. PATENT DOCUMENTS

| | | | |
|---|---|---|---|
| 3,999,158 | 12/1976 | Rae | 337/360 |
| 4,060,123 | 11/1977 | Hoffman et al. | 165/11 |
| 4,374,541 | 2/1983 | Hoberman | 165/11 R |

*Primary Examiner*—William E. Wayner
*Attorney, Agent, or Firm*—Richard L. Miller

[57] ABSTRACT

A thermostat device for motels/hotels requiring the guest use a key to select a desired room temperature which in turn requires that the thermostat must be set back to a preset temperature when guest desires to lock the door to his motel/hotel room upon leaving the room.

3 Claims, 3 Drawing Figures

ENERGY SAVING THERMOSTAT

BACKGROUND OF THE INVENTION

This invention relates generally to the setting of thermostatic room temperature control devices and specifically to a device for setting a room temperature in hotel and motel rooms.

It is well known that rising fuel costs have made heating and air conditioning bills rise in the past few years and those who are acquainted with the hotel and motel business know that these costs are especially burdensome in attempting to operate a profitable business. Guests often leave their rooms for many hours during which time the room is well heated or chilled despite the fact the room is empty. Guests when they enter a room adjust the thermostat to suit their needs but when they leave simply leave the thermostat at its setting.

Therefore it is a principal object of the present invention to provide a thermostatic room temperature control device for a wall thermostat control set at a particular temperature setting that is controllable by a key that allows a new temperature setting and that locks into the device until the new particular temperature setting is changed to the former particular temperature setting.

Another object of the present invention is to provide a thermostatic room temperature control device operable by a thermostatic key that is loosely mounted in association with a hotel/motel room door key so that a guest must remove the thermostat key from the thermostat control device in order to take the room door key along.

It is a further object of the present invention to provide a thermostatic room temperature setting device that has a housing that covers the room thermostat, the housing having indicia indicative of room temperature and an aperture keyway to a mounting connected to a thermostat, the mounting being rotatable by a key inserted in the keyway, the key being removable from the keyway only when the key is aligned with the aperture of the housing.

It is yet a further object of this invention to provide a housing for a thermostat on a wall, the thermostat being rotatable within the housing by a key inserted through an aperture in the housing having indicia generally indicative of temperature, the housing being rotatable about the thermostat and adapted to be fastened to mounting means mounted to the wall between the housing and the thermostat.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENT

Reference is now made in greater detail to the drawings.

Figure 1:
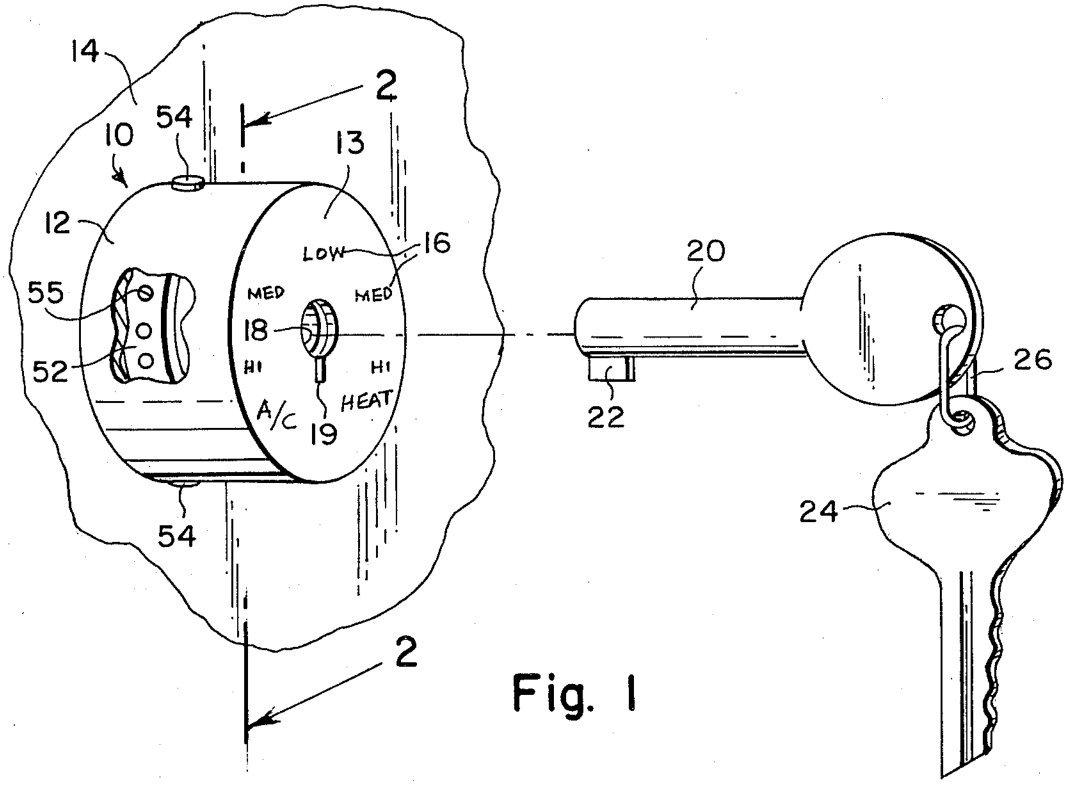
FIG. 1 is a perspective view of the invention.

The reference numeral 10 refers to the room temperature control device according to the present invention. As shown in FIG. 1, a substantially cylindrical housing 12 is mounted to a wall 14 located in a hotel or motel room. Housing 12 is provided on its face 13 with indicia 16, which as illustrated is indicated in general of room temperatures, at one end of the circular face 13 being indicative of temperature ranges associated with a heating mode and at the other end indicative of cooling ranges associated with an air conditioning mode.

The differing modes are for illustrative purposes only and of course the device may be connected only to heating or air conditioning resources. The particular mode of operation would be made operative by an operator during the change of seasons.

Face 13 of housing 12 is provided with an aperture 18 that is adapted to accept thermostatic control key 20 as seen in FIG. 1. Key 20 is preferably a simple cylindrical key with a turning catch 22. Aperture 18 has a notch 19 that is adapted to pass catch 22 when key 20 is inserted into the aperture. A room key 24 hung from the same key hold 26 as is control key 20. Key hold 26 is preferably of a strong metallic material such as stainless steel so that a room guest cannot easily separate the two keys.

Figure 3:
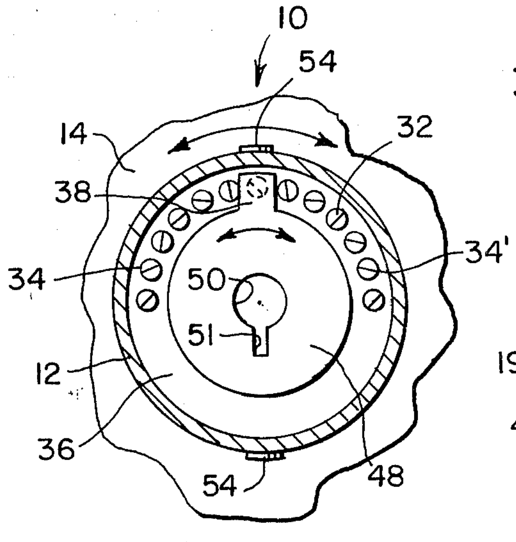
FIG. 3 is a cross-sectional view taken along line 3—3 of FIG. 2.
Figure 2:
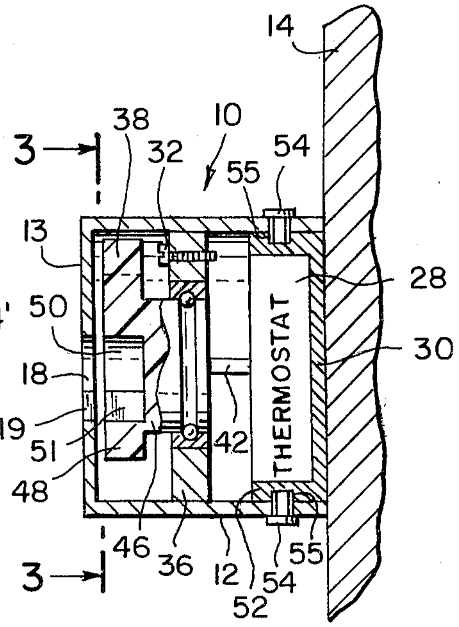
FIG. 2 is a cross-sectional view taken along line 2—2 of FIG. 1.

FIG. 2 illustrates in side section the device 10 showing a room temperature control thermostat 28 that is rotatively mounted to a mounting piece 30 that in turn is fastened to wall 14. Thermostat 28 is rotatable upon piece 30 by conventional means known in the art (not shown). FIG. 3 illustrates a series of screws 32 that set indicate typical low and high temperature range settings 34 and 34' respectively for thermostat face 13. The screws are set by the motel/hotel operator. All of the screws are adjusted so that their heads do not interfere with stop 38 except for the two screws at the end of the desired temperature range which are backed out of flange 36 so as to interfere with stop 38, and thereby provide a means of setting end limits for the desired temperature range.

Other methods of providing indications of temperature settings can be provided, such as indicia. Thermostat 28 is shown set at a first setting position as shown in FIG. 3.

Thermostat 28 is attached to mounting piece 30 inside housing 12, along with inner ring 52 by suitable securement means.

Thermostat mounting member 46 is rotatively mounted in housing 12 within flange 36. Shaft 42 is connected to member 46. Member 46 also extends outwardly to the inner side of face 13 of housing 12 at portion 48 which in turn in provided with a keyway 50 aligned with aperture 18 of the housing. Keyway 50 is adapted to accept key 20 and turning catch hold 51 is adapted to accept turning catch 22 of key 20 so that when key 20 is rotated, thermostat 28 is rotated along with member 46. The user can align key 20 generally with indicia 16 by position of the fingers. When key 20 is inserted in keyway 50 it is locked into the keyway when rotated since catch 22 strikes face 13 of the housing when the catch is not aligned with notch 19 of aperture 18.

Housing 12 is rotatively connected to wall 14 by a conventional method (not shown). Fastening means such as setting screws or pop rivets 54 are provided at the top and bottom of the housing. Screws or rivets 54 are adapted to be set into a plurality of recesses 55 (best shown in FIG. 1) of inner ring 52 so that housing 12 can be rotated in relation to wall 14. When indicia 16 are general, the guest will adjust the indicia to a temperature setting lower, or higher, as the case may be in winter or summer, than he might have otherwise have set it.

In operation, the operator of the hotel or motel sets the thermostat 28 to a selected temperature, for example, 60° F. in the winter, which is the first setting position. The guest, upon entering the room, inserts key 20 into housing 12 and turns the thermostat to the comfort range desired to one of a plurality of record selected setting positions. The room temperature will rise to that range, which could be, for purposes of exposition, 70° F. When the guest leaves the room, in order to take room key 24 with him, he must first remove key 20 from the housing an in so doing must rotate key 20 in the housing so as to slide catch 22 through notch 19. In so doing, thermostat 28 is rotated to the former 60° F. setting.

In order that the unit appear upright on the wall the motel/hotel operator removes screws or rivets 54, rotates the housing to the desired position and replaces screws or rivets 54 into a pair of the plurality of recesses 55 provided in ring 52, after first having selected proper temperature range by adjusting screws 32.

While certain novel features of this invention have been shown and described and are pointed out in the annexed claims, it will be understood that various omissions, substitutions and changes in the forms and details of the device illustrated and in its operation can be made by those skilled in the art with out departing from the spirit of the invention.

What is claimed is:

1. A thermostatic room temperature control device, in combination, comprising:

a thermostat means rotatively mounted on a wall in a room, said thermostat adapted to be connected with a control means related to room temperature, said thermostat including a mounting piece having a face having a plurality of temperature setting indicators in association with said control means, said thermostat means being rotatable to said plurality of setting indicators, said thermostat being set in a first setting position;

a housing mounted to said wall enclosing said thermostat, said housing having a housing face with indicia, said face being in association with said setting indicators;

said housing forming an aperture and said thermostat means forming a keyway means, said aperture being adapted to pass a key to said keyway means, said keyway means being for rotating said thermostat between a first position and a plurality of selected second positions upon rotation of said key in said keyway means, said keyway means and said aperture also being for holding said key in said keyway means until said key is rotated to said first position and a key holding means for holding said key along with the room key, whereby when the key is inserted into said device, the room key cannot be used until the key is rotated in the device and the thermostat is returned to its first setting position.

2. The device according to claim 1, further including a fixed inner ring mounted between said thermostat means and said housing upon said wall, said thermostat means being rotative within said ring and wherein said housing is rotatively mounted to said wall and further including fastening means for connecting said housing to said ring in a plurality of positions.

3. The device according to claim 2, whereby said indicia on said face is generally descriptive, whereby a user is able only to rotate said key to a generally selective position relative to the selected temperature setting in said housing.

* * * * *